(12) United States Patent
Vermette

(10) Patent No.: US 10,255,583 B2
(45) Date of Patent: Apr. 9, 2019

(54) NESTED HIERARCHICAL ROLLUPS BY LEVEL USING A NORMALIZED TABLE

(75) Inventor: Shane Robert Vermette, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2697 days.

(21) Appl. No.: 11/742,957

(22) Filed: May 1, 2007

(65) Prior Publication Data

US 2008/0275742 A1 Nov. 6, 2008

(51) Int. Cl.
*G06Q 10/10* (2012.01)
*G06Q 10/06* (2012.01)

(52) U.S. Cl.
CPC ........... *G06Q 10/10* (2013.01); *G06Q 10/063* (2013.01)

(58) Field of Classification Search
CPC .................................................. G06Q 10/063
USPC .............................................. 705/7; 707/603
See application file for complete search history.

(56) References Cited

U.S. PATENT DOCUMENTS

| | | | | |
|---|---|---|---|---|
| 6,101,481 | A * | 8/2000 | Miller | 705/9 |
| 7,571,182 | B1 * | 8/2009 | Eddy | G06F 17/30595 |
| 7,734,491 | B2 * | 6/2010 | Kayahara et al. | 705/8 |
| 7,778,899 | B2 * | 8/2010 | Scumniotales et al. | 705/35 |
| 2005/0065966 | A1 * | 3/2005 | Diab | 707/102 |
| 2005/0131929 | A1 * | 6/2005 | Bailey | G06F 17/30592 |
| 2005/0138160 | A1 * | 6/2005 | Klein | H04L 41/024 709/223 |
| 2005/0278208 | A1 * | 12/2005 | Schultz | 705/8 |
| 2006/0048050 | A1 * | 3/2006 | Cox et al. | 715/513 |
| 2007/0055596 | A1 * | 3/2007 | Yankovich | G06Q 40/02 705/35 |
| 2007/0106769 | A1 * | 5/2007 | Liu | G06F 9/455 709/223 |
| 2007/0288495 | A1 * | 12/2007 | Narasayya | G06F 17/30306 |
| 2008/0082389 | A1 * | 4/2008 | Gura | 705/9 |
| 2010/0235300 | A1 * | 9/2010 | Feingold | 705/36 R |

OTHER PUBLICATIONS

Mansmann, S., Extending Visual OLAP for Handling Irregular Dimensional Hierarchies: Data Warehousing and Knowledge Discovery Lecture Notes in Computer Science vol. 4081, 2006, pp. 95-105.*
Workflow management in software engineering projects A Oberweis—Proceedings of the 2nd International Conference on . . . , 1994—researchgate.net.*
Data Warehouse Basics BK Sy, AK Gupta—Information-Statistical Data Mining, 2004—Springer.*
Extending Visual OLAP for Handling Irregular Dimensional Hierarchies S Vinnik, M Scholl—Citeseer, Sep. 2006.*
Hierarchy-driven Visual Exploration of Multidimensional Data Cubes. S Mansmann, F Mansmann, MH Scholl, DA Keim—BTW, 2007—researchgate.net.*

* cited by examiner

*Primary Examiner* — Jonathan G Sterrett
(74) *Attorney, Agent, or Firm* — Kilpatrick Townsend & Stockton, LLP

(57) ABSTRACT

Nested hierarchies can be efficiently analyzed by normalizing a portion of the hierarchy as defined by a limiting factor for the hierarchy. In a project hierarchy wherein each project contains a task hierarchy, each task hierarchy can be normalized. Further, the projects can be assigned to levels such that data for each level can be indexed, partitioned, or otherwise differentiated. The data then can be efficiently rolled up by level using the partially normalized hierarchy.

29 Claims, 6 Drawing Sheets

NESTED HIERARCHICAL ROLLUPS BY LEVEL USING A NORMALIZED TABLE

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

For many business and other applications, there is a need to report, query, or otherwise analyze hierarchical groupings of data. For example, a business need in project performance reporting is to support hierarchical groupings of projects, and to support the rollup of financial information for those hierarchies. As shown in FIG. 1(a), a user at a computer 104 or workstation might request a report indicating revenue for a given project, the request being passed through a network 102 to a business applications or other such server 106 which is able to extract the financial information from at least one appropriate database 108 and generate a report to be transmitted via the network to the user computer. Each of the projects in the hierarchical project grouping itself can contain a task hierarchy, such as a strict tree structure consisting of a set of individual tasks, wherein each task has only one parent task. Further, the top task in a hierarchy only has one parent node, namely the respective project, which can have its own data as well as multiple parents. Each task also can be linked to another project, which in turn can contain another task hierarchy. The projects themselves also can be arranged in a hierarchy, which further can allow for a project to not only have multiple children but also to have multiple parents and siblings in the structure as known in the art. It is then necessary to figure out how to allocate the information for these tasks between the various associated projects and tasks. For example, a task reporting revenue may need to be rolled up into multiple different tasks in its project, and the project containing that task may further need to be rolled up into other projects. It is desirable to be able to report, for example, the revenue amounts against any project into which a project or task rolls up. Thus, the overall structure is a nested hierarchy, as the project hierarchy can contain multiple hierarchies of tasks. These tasks further need to be able to rollup appropriately across the entire hierarchy. As the need for improved performance increases, existing approaches to hierarchy-wide rollups are no longer sufficient.

The overall project data model thus can be construed as a "tree" structure of projects, wherein each project itself includes a tree structure of tasks. As shown in the exemplary hierarchy 150 of FIG. 1(b), a project at the top of the hierarchy, such as project P1 or P2, has no ancestors, but can have multiple descendents, such as projects P3 and P4. For each of the projects that has descendants, one business need is to report the data of all the projects and tasks that are descendents of that project. Each project can have an arbitrary number of tasks and an arbitrary number of descendents.

Typically, information about such hierarchies is stored in a table consisting of links, indicating which tasks are linked to which other tasks. For example, a table for the project hierarchy 150 depicted in FIG. 1(b) would indicate that task T3 in project P2 has a link to parent task T1 and a link to child task T4. The link from one project to another project can be stored as a link from a task in the first project directly to the second project. For example, a table for the links depicted in FIG. 1(b) would indicate that task T6 in project P2 has a link to project P4.

A prior approach to obtaining the necessary rollup information was to "normalize" the link information into another table such that a single scan or query on a task in the normalized table returns all of the descendants or ancestors for that task. For a normalized table of the links for the project hierarchy 150 of FIG. 1(b), a query on task T2 of project P4 (i.e., P4.T2) can return tasks P4.T1, P2.T6, P2.T4, P2.T3 and P2.T1. When doing a rollup, then, the amount of each task is obtained, and the task is joined to this table such that for each task and its descendants the amount that needs to be reported against that task can be determined. However, this normalized table is exponential in size with the total number of tasks, or depth of the hierarchy, as the normalized table will have to list all the ancestors of each task. It is also exponential in the number of "levels" in the project hierarchy, and thus does not scale. To obtain all the data of the descendents of a task thus would only take a single scan, but the single scan would be on a table that grows exponentially and thus does not provide a scalable project hierarchical reporting solution.

In another prior approach which does not utilize a normalized table, data from descendents is retrieved by going directly to the table that stores links between tasks of a tree in a flat list. A recursive query then is performed on the task links, using multiple joins to obtain all descendants of a task. The query thus can run as a loop until all data is obtained. For reporting purposes, the recursive query needs to be run for each task in each project in the hierarchy, which results in exponential run-time. Furthermore, recursive queries on large data volumes consume a lot of memory, thus not providing an efficient project hierarchical reporting solution.

BRIEF SUMMARY OF THE INVENTION

Systems and methods in accordance with various embodiments of the present invention allow for efficient reporting of data from a nested hierarchy. In one embodiment, a nested hierarchy includes a first hierarchy including a plurality of projects, each project further including a second hierarchy of tasks. In various embodiments each task has at most one direct ancestor in the respective second hierarchy, although other embodiments can utilize hierarchies wherein tasks can have multiple direct ancestors. After analyzing the links for the nested hierarchy, which can be between tasks as well as between tasks and projects, levels can be defined whereby any first project containing a task linking to a second project is in a shallower level than the second project. The level selection further can be made to minimize the number of necessary levels. The data for the nested hierarchy then can be partitioned, indexed, or otherwise sufficiently differentiated by level, and the task data for each project in a level can be normalized.

After the levels have been defined and data differentiated and normalized, a request for information can be received. This information can relate to tasks that have links to projects and other tasks, such that it is necessary to rollup or report that task data for each task or project at shallower levels that are linked to that task. For each defined level in the hierarchy, task data for each project in the current level is rolled up or reported against the appropriate task or project. After rolling up task data for each project at the current level, project data for a project at the current level is rolled up to any task at a shallower level that links to that project. After rolling up data for the defined levels, the rolled up data is reported appropriately in response to the request.

In such an embodiment, the task data can include financial or other such information. The projects in the hierarchy also can have multiple direct ancestors. The links can be stored in a single table, and a limiting factor can be selected that defines which portion(s) of the table can be normalized. Further, the rollup for each project can include a constant number of scans, and the number of data scans for each level can be constant.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments of the present invention overcome the aforementioned and other deficiencies in existing information and reporting systems by changing the way in which data hierarchies are analyzed. The efficiency of normalized tables can be utilized advantageously in a nested hierarchy by setting an appropriate limiting factor such that a portion of the hierarchy can be completely normalized. This limiting factor can be determined using any of a number of approaches, such as a function-wise or performance-wise approach. In one embodiment, the functional idea (e.g., projects and tasks) lent itself well to the technical requirement of normalizing only part of the hierarchy, and thus providing an optimal limiting factor on the normalized hierarchy, although other limiting factors may be more appropriate for other structures, etc.

In a project/task hierarchy such as is described above, each task hierarchy can be completely normalized without normalizing the project hierarchy. Rollups then can be performed using a constant number of scans within a level, and those rollups then can be elevated to the next level. Such an approach provides a way to scale the depth of the nesting hierarchy, and provides for efficient normalized table rollups for the nested hierarchy. Further, a partially normalized table can be used wherein the table may contain two tasks which can only be normalized if those tasks are in the same project. Such a partially normalized table is not exponential in the number of levels in the nesting hierarchy, but rather is exponential in the portion of the nested hierarchy that keeps the table sufficiently small. The non-recursive nature allows the state to be stored in a database instead of in memory, and such an approach allows breaking up the work into sufficiently small levels, which can be stored in separate partitions, indexed by level, or otherwise distinguished.

While the various embodiments will be discussed with respect to projects and tasks for purposes of simplicity and understanding, it should be understood that this is merely exemplary and that any of a number of other node and information types can be used as would be apparent to one of ordinary skill in the art. Further, the data need not be in relational database "tables" but rather can be in any representation that allows the data to be scanned.

Figure 1A:
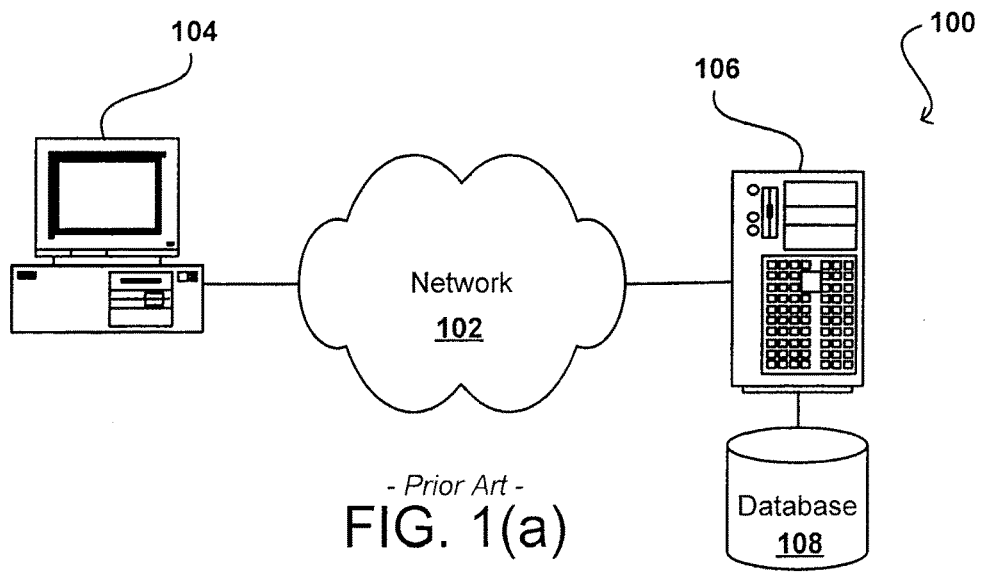
FIG. 1(a) illustrates an exemplary querying and reporting system of the prior art.
Figure 1B:
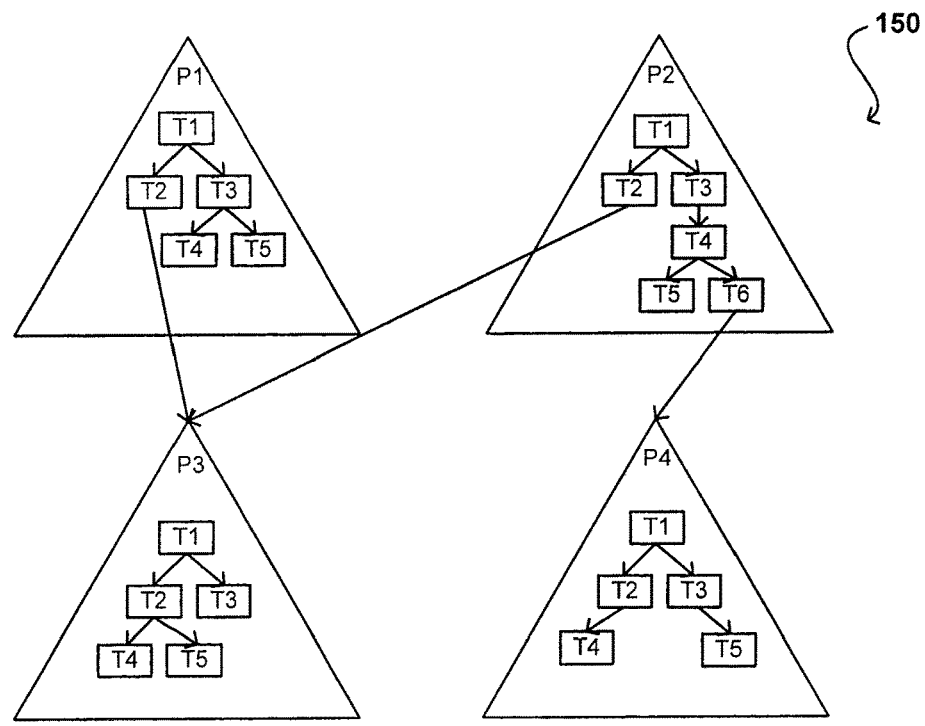
FIG. 1(b) illustrates a project hierarchy of the prior art.
Figure 2:
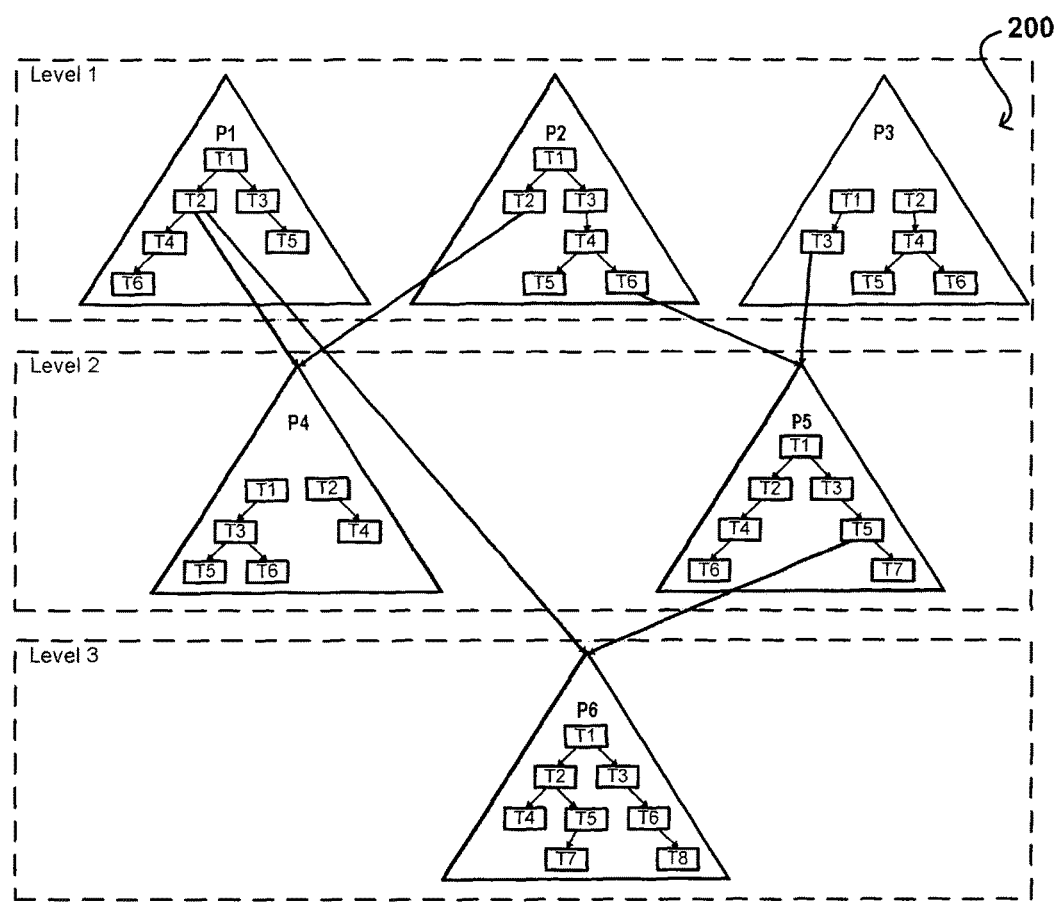
FIG. 2 illustrates an exemplary project hierarchy that can be used in accordance with one embodiment of the present invention.

In one embodiment, an algorithm is used that informally defines the notion of levels of a hierarchy. In one such level definition, any first project that contains a task with a link to a second project must be in a shallower level than that second project. For example, the project hierarchy 200 of FIG. 2 shows that tasks P1.T2, P2.T2, P2.T6, and P3.T3, whose projects are all contained in level 1, each link to projects in level 2; task P1.T2, whose project is in level 1, and task P5.T5, whose project is in level 2, both link to project P6 in level 3. Further, levels can be assigned to projects in such a way as to minimize the total number of levels, such that the "depth" of the hierarchy, i.e. the level of the deepest project, is minimized. For example, since project P4 in the example only has links from level 1, then project P4 is placed in level 2. Since project P6 has links from tasks in both levels 1 and 2, then project P6 is placed in the next possible shallowest level, here level 3.

Further, the notion of "rolling up data" or creating "rollups" is a process by which the data from all the descendents of a task or project is retrieved and reported against that task or project. An exemplary algorithm useful for nested hierarchical rollups by level is a non-recursive algorithm, which goes through a number of iterations necessary to traverse the project hierarchy. At each iteration, the algorithm considers data from the current level as well as any data that has been rolled up from the descendents of the current level. The number of table scans per level can be a constant, such as described elsewhere herein. The data also can be distinguished (e.g., partitioned or indexed) by level, such that each iteration of the loop need only scan the data at the current level. Following is an example of such an algorithm for nested hierarchical rollups by level using a normalized table:

```
let level = # of levels in the project hierarchy
while (level > 0) loop
    do not rollup the current level if it has
    already been rolled up
    for (all projects at the current level) loop
        rollup data, using a normalized table,
        along the hierarchy of tasks within
        each project
    end for loop
    for (all data at the top of each task
        tree structure of each project at
        the current level) loop
        rollup the data to all tasks which
        have a link to the project
    end for loop
    level = level − 1
    optional commit
end while loop
```

Each row of the data to be rolled up by its task hierarchy can contain an identifier of a project to which that row belongs. As the normalized table contains the task hierarchy for every project, a single join between the data to be rolled up and the normalized table can be used to rollup the data for all projects. Similarly, all information about which projects have tasks linked to them can be stored in a single table. Therefore, a single join between the data at the tops of the task hierarchies and the table with the link information can be used to rollup the data to all the tasks that contain links to the projects. Since the two inner loops of the algorithm in this example use a constant number of table-scans, the total number of scans required per level by the algorithm is also constant.

Such an approach can be extended into an arbitrarily nested hierarchy. Since it is efficient to use the normalized table to do the rollups when the size of the normalized table is sufficiently small, then for an arbitrarily nested hierarchy it becomes a matter of determining how much detail can be stored in the normalized table. In one embodiment, it is practical to store the complete normalized task hierarchy, but not the complete normalized hierarchy of tasks between projects. Therefore, the largest portion of the hierarchy that can be fully normalized becomes the size of a level in that algorithm.

As discussed above, a partially normalized table can be used wherein a table may contain two tasks which are only normalized if those tasks are in the same project. Such an approach allows breaking up the work into sufficiently small levels, which can be stored in separate partitions, indexed by level, etc. Such an approach can require more scans of the data than would be necessary using a fully normalized table, i.e. a table in which two tasks are normalized regardless of whether they are in the same project. However, as indicated earlier, using a fully normalized table will not scale. Furthermore, the repeated scan time is reduced by differentiating the data by level. Since each iteration of the algorithm's loop takes places across an entire level, each iteration of the algorithm's loop can be on a very large subset of data. However, this can be taken care of when needed by running the algorithm only on particular groups of projects. The projects in hierarchy 200 of FIG. 2 are an example of such a group since any two of the projects are connected by some path of links.

Since the data has been broken up into sufficiently small levels, the algorithm can commit after rolling up the data at each current level if it is implemented on a system that allows such commits. This allows for benefits such as better recovery from environmental issues and reduction in the total amount of memory needed to run the algorithm. The reduction in the total amount of memory needed is achieved since the algorithm is spread over as many transactions as there are levels in the hierarchy. The improved recoverability is achieved in one embodiment by committing after portions of the work performed by the algorithm are complete, and ensuring that that work is not repeated if the algorithm fails due to environment issues and is restarted. A result of such a process is that the entire algorithm does not need to be rerun.

For purposes of illustration and simplicity of understanding, and because of the business requirements of a basic project implementation, a hierarchy with a single degree of nesting is discussed herein (e.g., where a project can contain strict hierarchies of tasks), but approaches discussed herein also will work with an arbitrary degree of nesting (e.g., where a project can itself contain a hierarchy of projects). The structure of projects is not a strict tree structure in the examples contained herein, although such an implementation can be used as well. The project hierarchy can follow a rule, however, such as where no project may roll up into another project via more than one path. While the tree structure of tasks is a strict tree in the examples contained herein, each project may contain more than one tree of tasks. Furthermore, the principles of the present invention remain the same even if the task hierarchies are not required to be strict trees, i.e. when a task can have more than one immediate ancestor.

One benefit to such an approach is the constant number of scans in the database per level. At each iteration of the "loop" in the algorithm, both the amounts pulled in from tasks at the current level and tasks that have been rolled up from deeper project levels are considered. The deepest level of projects is scanned first, then the appropriate task rollups are performed, those amounts are rolled up to the next level, and so on, until all necessary rollups are completed.

Task and project data is typically stored in the source system, on a from-to basis between tasks, and from tasks to projects. Since any project can roll-up into a task, that task itself is part of the project hierarchy. Such an arrangement still can be treated as one project rolling up into another project. The task information then can be normalized. The normalized table then can be used for the inner portion of the loop, which is rolling up the task portion. By differentiating the data by level, the entire hierarchy does not need to be scanned, as only the level or levels of interest can be scanned, thereby reducing the number of scans needed.

Figure 3:
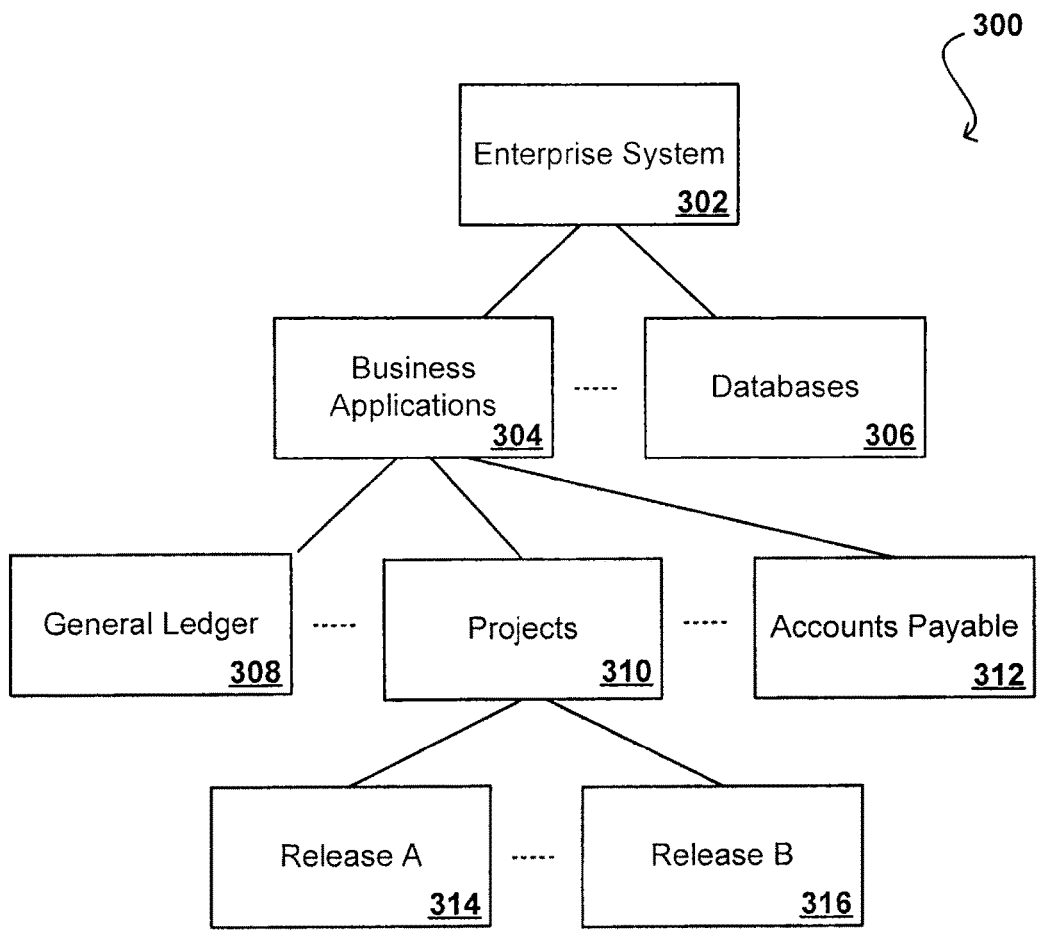
FIG. 3 illustrates a system overview that can be used in accordance with one embodiment of the present invention.

FIG. 3 illustrates an exemplary enterprise implementation 300 for which such an approach can be useful. An enterprise system 302 can utilize various applications, such as business applications 304, as well as a number of databases 306 and other such data sources. The business applications also can utilize a number of applications or modules, such as for general ledger 308, projects 310, and accounts payable 312. Within the projects application there also can be multiple versions 314, 316. Although the embodiments are described with respect to the projects portion, it should be understood that any other portion of this implementation, as well as various other implementations, can advantageously utilize the approaches described herein.

Figure 4:
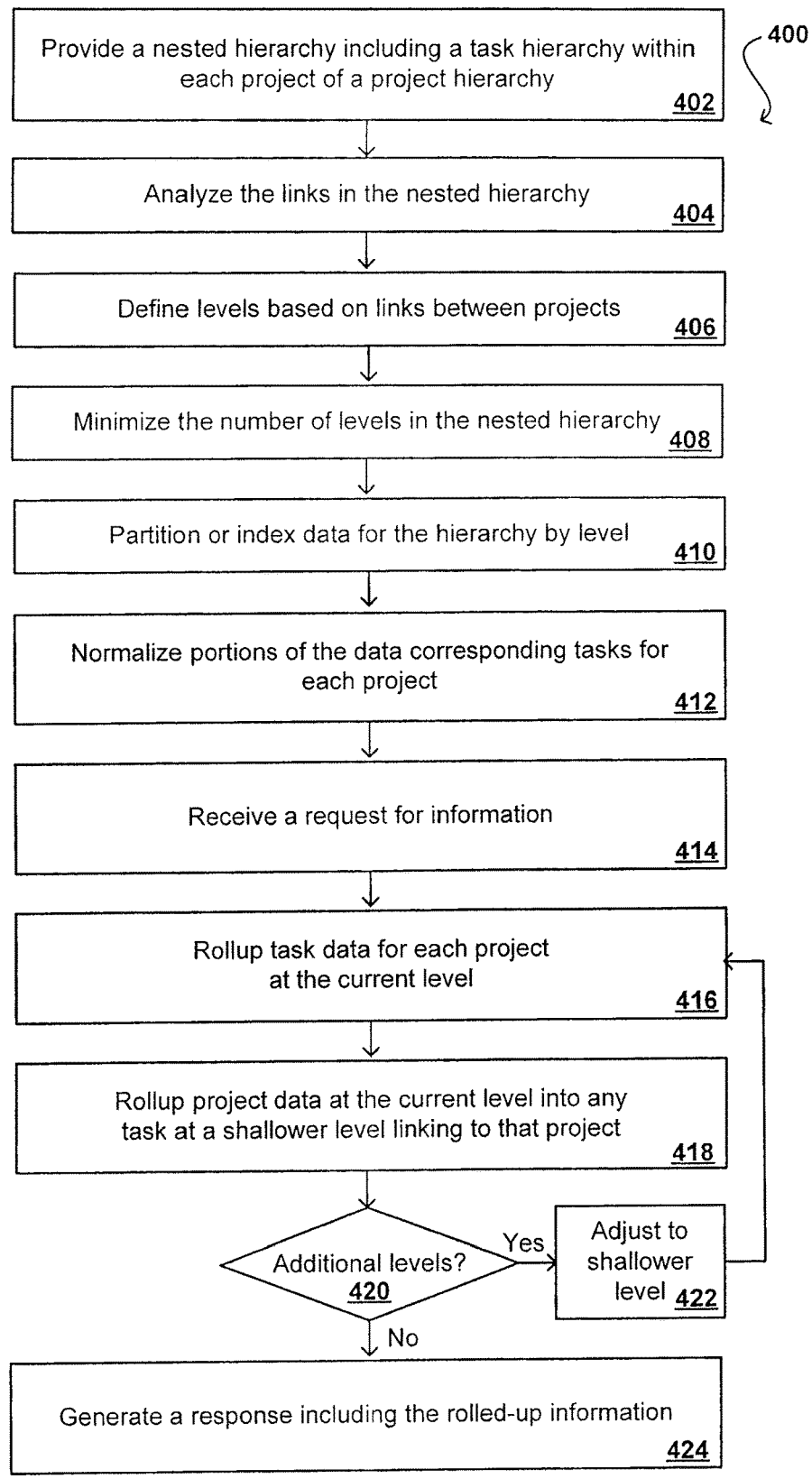
FIG. 4 illustrates an exemplary method for rolling up information that can be used in accordance with one embodiment of the present invention.

FIG. 4 illustrates steps of an exemplary method 400 for rolling up data that can be used in accordance with one embodiment. In the method, a nested hierarchy is provided including a first hierarchy including a plurality of projects, and a second hierarchy including a plurality of tasks within each of the projects, wherein each task in the second hierarchy can have only one direct ancestor 402. The links in the nested hierarchy are analyzed, the links occurring between tasks and between tasks and projects 404. Levels for the hierarchy are defined where in each level any first project that contains a task with a link to a second project must be in a shallower level than that second project 406. Projects are assigned to the first possible level in order to minimize the number of levels to be analyzed 408. The data is then differentiated (e.g., partitioned or indexed) by level 410, and portions of the data table corresponding to tasks of the same project can be normalized 412. When a request for task information is received 414, a rollup of the nested hierarchy occurs. For each level of the hierarchy, task data for all projects at the current level is rolled up using at least one normalized portion of the hierarchy 416. At the top of each task hierarchy for projects at the current level, the current project data is rolled up into all tasks at shallower levels linking to those projects 418, and that data will be analyzed again when the shallower levels to which it was rolled up are analyzed 416. If there are additional (shallower) levels that have not been rolled up 420, then the current level is adjusted to a shallower level 422 and the rollup process continues for the adjusted current level at step 416. If all the levels have been analyzed, the appropriate information is returned in response to the request 424.

While embodiments discussed above can be considered as referencing a freestanding request for rollup amounts by a user, along with the subsequent retrieval of the amount(s), the request for the rollup of data can also be part of a larger user requested program, one step of which includes an algorithm as discussed herein. For example, a user submitted program (which can also be scheduled to be submitted at intervals) can have many steps that do various data transformations, one transformation of which involves the rollup of the data using an algorithm as discussed herein. The algorithm also can be used in a manner in which the request to do the rollups (whether the program is submitted by the user or submitted by a user-defined schedule) is not in sync with the request to view the data, which can come whether or not the program has been run. Such an out-of-sync model can also be used with other embodiments discussed and suggested herein.

Figure 5:
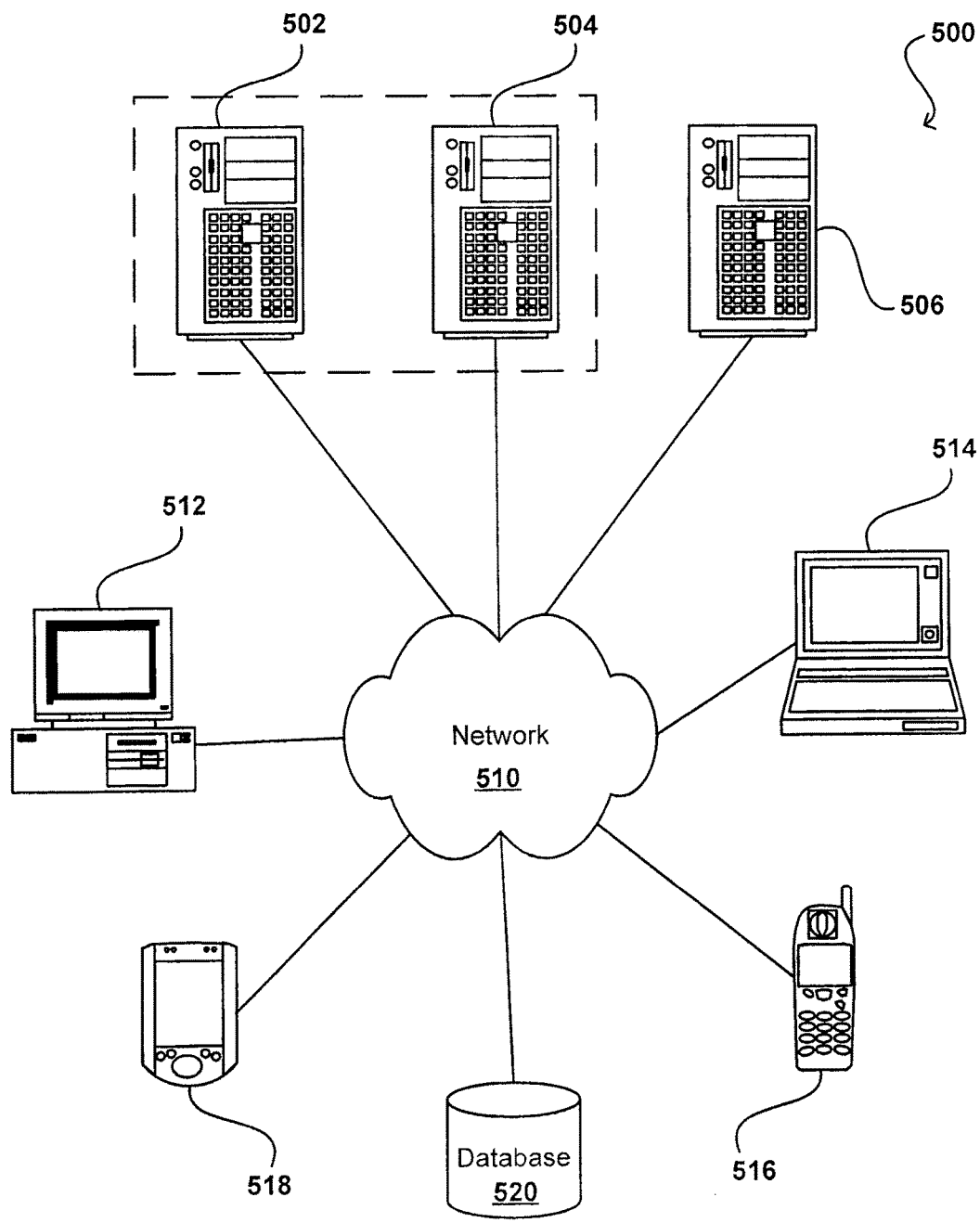
FIG. 5 illustrates components of a computer network that can be used in accordance with one embodiment of the present invention.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2 G, 2.5 G, 3 G, 4 G, Wimax, WiFi, CDMA 2000, WCDMA, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10 g, that is adapted to store, update, and retrieve data in response to SQL-formatted commands.

Figure 6:
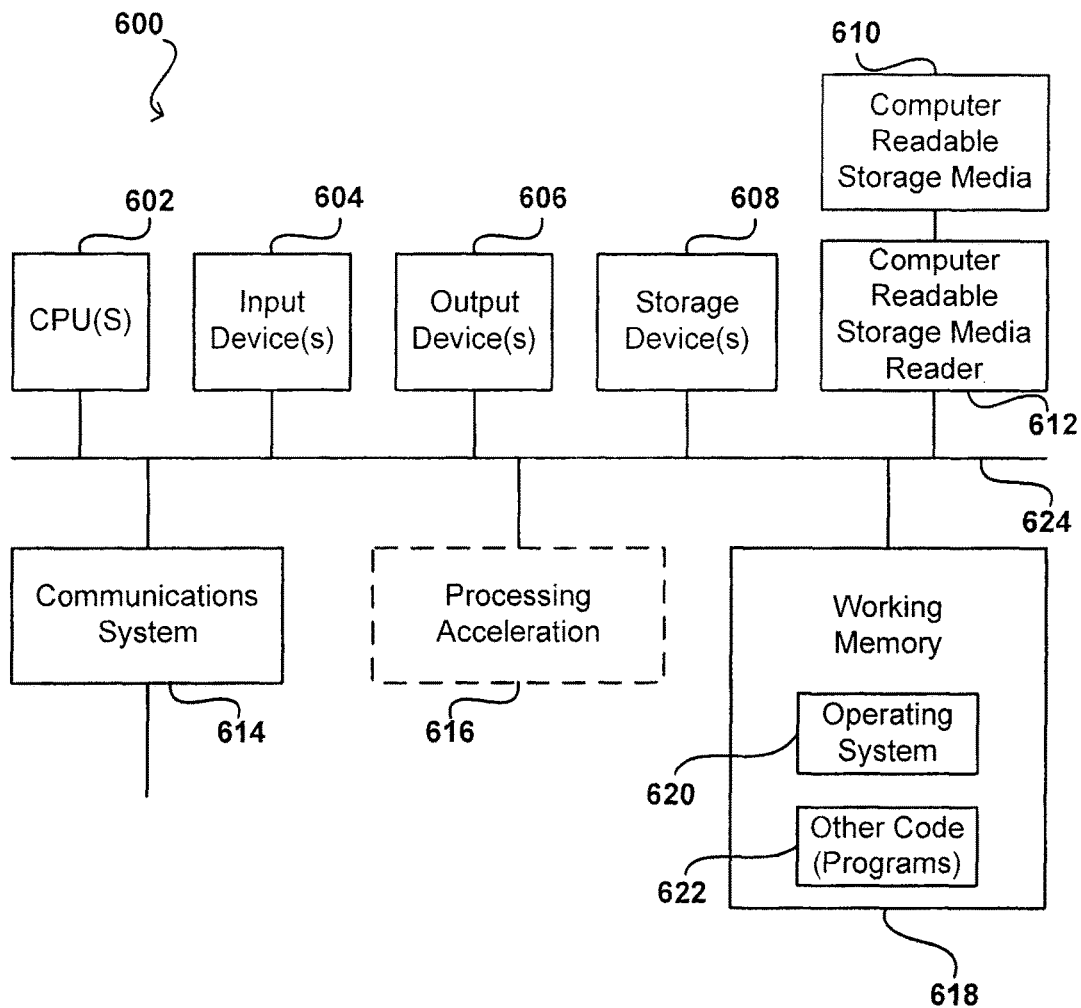
FIG. 6 illustrates components of a computerized device that can be used in accordance with one embodiment of the present invention.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of obtaining information from a nested hierarchy of data stored in a database, the method comprising:
    defining, using a computer processor, levels of the nested hierarchy of data, wherein the nested hierarchy of data includes a first hierarchy of data which includes data for a plurality of projects which includes a first project including a task linking to a second project which is in a shallower level of the hierarchy of data than the second project, wherein the nested hierarchy of data includes a second hierarchy of data which includes a plurality of tasks, and wherein each of the plurality of tasks in the second hierarchy of data can only have one direct ancestor;
    assigning each of the plurality of projects to a shallowest possible level of the nested hierarchy of data in order to minimize a number of levels of the nested hierarchy of data to be analyzed and each of the plurality of tasks based on one or more ancestors of each task;
    analyzing the nested hierarchy of data to determine link data for each of the links between the plurality of projects and the plurality of tasks;
    distinguishing, using the computer processor, data for the nested hierarchy of data by separately indexing the data of each level of the nested hierarchy of data;
    normalizing, using the computer processor, task data for each project in a level of the nested hierarchy of data by adding the determined link data for each of the links between the plurality of projects and the plurality of tasks to a partially normalized table, wherein tasks in a level are only normalized if the tasks are in the same project;
    in response to receiving a request for task information for at least one of the plurality of tasks, for each level in the nested hierarchy of data, rolling up, using the computer processor, the normalized task data for each project at a current level;
    after rolling up the normalized task data for each project at the current level, rolling up, using the computer processor, project data for a project at the current level to any task at a shallower level that links to that project; and
    after rolling up data for the defined levels of the nested hierarchy of data, reporting, the computer processor, the rolled up data in response to the request.

2. The method according to claim 1, further comprising:
analyzing links from each task in each second hierarchy of data before defining levels of the nested hierarchy of data.

3. The method according to claim 1, wherein:
the task data includes reportable information.

4. The method according to claim 1, wherein:
each second hierarchy of data includes any number of strict tree structures.

5. The method according to claim 1, wherein:
each project in the first hierarchy of data is capable of having more than one direct ancestor project.

6. The method according to claim 1, further comprising:
storing in a table the links from tasks.

7. The method according to claim 6, further comprising:
setting a limiting factor for the table defining portions of the table which can be normalized.

8. The method according to claim 1, wherein:
a rollup for each project includes a constant number of scans of project data.

9. The method according to claim 1, wherein:
rolling up task data for a task includes retrieving data from descendants of the task and reporting that data against the task.

10. The method according to claim 1, wherein:
a number of data scans for each level is constant.

11. The method according to claim 1, wherein:
distinguishing data for the nested hierarchy of data by level includes at least one of partitioning and indexing the data by level.

12. A system for obtaining information from a nested hierarchy of data, comprising:

a data storage device operable to store data for the nested hierarchy of data, the nested hierarchy of data including a first hierarchy of data including a plurality of projects, each project further including a second hierarchy of tasks; and an application server in communication with the data storage device and including instructions that when executed cause the application server to:

define levels of the nested hierarchy of data, wherein the plurality of projects includes a first project including a task linking to a second project which is in a shallower level of the nested hierarchy of data than the second project, wherein the nested hierarchy of data includes a second hierarchy of data which includes a plurality of tasks, and wherein each of the plurality of tasks in the second hierarchy of data can only have one direct ancestor;

assign each of the plurality of projects to a shallowest possible level of the nested hierarchy of data in order to minimize a number of levels of the nested hierarchy of data to be analyzed and each of the plurality of tasks based on one or more ancestors of each task;

analyze the nested hierarchy of data to determine link data for each of the links between the plurality of projects and the plurality of tasks;

distinguish data for the nested hierarchy of data by separately indexing the data of each level of the nested hierarchy of data;

normalizing task data for each project in a level of the nested hierarchy of data by adding the determined link data for each of the links between the plurality of projects and the plurality of links to a partially normalized table, wherein tasks in a level are only normalized if the tasks are in the same project;

in response to receiving a request for task information for at least one of the plurality of tasks, for each level in the nested hierarchy of data, roll up the normalized task data for each project at a current level;

after rolling up the normalized task data for each project at the current level, roll up project data for a project at the current level to any task at a shallower level of the nested hierarchy of data that links to that project; and after rolling up data for the defined levels of the nested hierarchy of data, report the rolled up data in response to the request.

13. The system according to claim 12, wherein:
the application server further includes instructions for analyzing links from each task in each second hierarchy of data before defining levels of the nested hierarchy of data.

14. The system according to claim 12, wherein:
the task data includes reportable information.

15. The system according to claim 12, wherein data is differentiated by the level of the nested hierarchy of data.

16. The system according to claim 12, wherein:
each project in the first hierarchy of data is capable of having more than one direct ancestor project.

17. The system according to claim 12, wherein:
the application server further includes instructions for storing in a table the links from tasks.

18. The system according to claim 17, wherein:
the application server further includes instructions for setting a limiting factor for the table defining portions of the table which can be normalized.

19. The system according to claim 12, wherein:
a rollup for each project includes a constant number of scans of project data.

20. The system according to claim 12, wherein:
rolling up task data for a task includes retrieving data from descendants of the task and reporting that data against the task.

21. The system according to claim 12, wherein portions of a data table correspond to the plurality of linked tasks.

22. The system according to claim 12, wherein:
distinguishing data for the nested hierarchy of data by level includes at least one of partitioning and indexing the data by level.

23. A non-transitory computer readable medium comprising a set of instructions stored therein which, when executed by a processor, causes the processor to obtain information from a nested hierarchy of data stored in a database by:

defining levels of the nested hierarchy of data, wherein the nested hierarchy of data includes a first hierarchy of data which includes a plurality of projects which includes a first project including a task linking to a second project which is in a shallower level of the hierarchy of data than the second project, wherein the nested hierarchy of data includes a second hierarchy of data which includes a plurality of tasks, and wherein each of the plurality of tasks in the second hierarchy of data can only have one direct ancestor;

assigning each of the plurality of projects to a shallowest possible level of the nested hierarchy of data of the nested hierarchy of data in order to minimize a number of levels of the nested hierarchy of data to be analyzed and each of the plurality of tasks based on one or more ancestors of each task;

analyzing the nested hierarchy of data to determine link data for each of the links between the plurality of projects and the plurality of tasks;

distinguishing data for the nested hierarchy of data by separately indexing the data of each level of the nested hierarchy of data;

normalizing task data for each project in a level of the nested hierarchy of data by adding the determined link data for each of the links between the plurality of projects and the plurality of tasks to a partially normalized table, wherein tasks in a level of the nested hierarchy of data are only normalized if the tasks are in the same project;

in response to receiving a request for task information for at least one of the plurality of tasks, rolling up the normalized task data for each project at a current level for each level in the nested hierarchy of data;

rolling up project data for a project at the current level to any task at a shallower level of the nested hierarchy of data that links to that project, after rolling up task data for each project at the current level; and reporting the rolled up data in response to the request, after rolling up data for the defined levels of the nested hierarchy of data.

24. The non-transitory computer readable memory according to claim 23, further comprising:
analyzing links from each task in each second hierarchy of data before defining levels of the nested hierarchy of data.

25. The non-transitory computer readable memory according to claim 23, wherein:
each second hierarchy of data includes any number of strict tree structures.

26. The non-transitory computer readable memory according to claim 23, wherein:

each project in the first hierarchy of data is capable of having more than one direct ancestor project.

27. The non-transitory computer readable memory according to claim 26, further comprising:
setting a limiting factor for the table defining portions of the table which can be normalized.

28. The non-transitory computer readable memory according to claim 23, wherein:
rolling up task data for a task includes retrieving data from descendants of the task and reporting that data against the task.

29. The non-transitory computer readable memory according to claim 23, wherein:
distinguishing data for the nested hierarchy of data by level includes at least one of partitioning and indexing the data by level.

* * * * *

UNITED STATES PATENT AND TRADEMARK OFFICE
CERTIFICATE OF CORRECTION

| | | |
|---|---|---|
| PATENT NO. | : 10,255,583 B2 | Page 1 of 1 |
| APPLICATION NO. | : 11/742957 | |
| DATED | : April 9, 2019 | |
| INVENTOR(S) | : Vermette | |

It is certified that error appears in the above-identified patent and that said Letters Patent is hereby corrected as shown below:

In the Specification

In Column 5, Line 54, delete "that that" and insert -- that --, therefor.

In Column 7, Line 63, delete "GRPS," and insert -- GPRS, --, therefor.

In the Claims

In Column 10, Line 34, in Claim 1, before "the" insert -- using --.

In Column 12, Lines 28-29, in Claim 23, delete "of the nested hierarchy of data of the nested hierarchy of data" and insert -- of the nested hierarchy of data --, therefor.

Signed and Sealed this
Third Day of November, 2020

Andrei Iancu
*Director of the United States Patent and Trademark Office*